US008781938B2

(12) United States Patent
Willis et al.

(10) Patent No.: US 8,781,938 B2
(45) Date of Patent: *Jul. 15, 2014

(54) COMPUTER-IMPLEMENTED METHOD AND APPARATUS FOR ADJUSTING THE COST BASIS OF A SECURITY

(71) Applicant: Networth Services, Inc., Phoenix, AZ (US)

(72) Inventors: Nico Willis, Phoenix, AZ (US); Laura Muggli, San Ramon, CA (US)

(73) Assignee: Networth Services, Inc., Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/972,138

(22) Filed: Aug. 21, 2013

(65) Prior Publication Data
US 2013/0339274 A1    Dec. 19, 2013

Related U.S. Application Data

(63) Continuation of application No. 12/505,418, filed on Jul. 17, 2009, which is a continuation of application No. 09/844,198, filed on Apr. 27, 2001, now Pat. No. 7,606,753.

(60) Provisional application No. 60/200,088, filed on Apr. 27, 2000.

(51) Int. Cl.
*G06Q 40/00* (2012.01)

(52) U.S. Cl.
USPC ............... 705/36 R; 705/30; 705/31; 705/35

(58) Field of Classification Search
USPC ..................... 705/30, 31, 35, 36 R
See application file for complete search history.

(56) References Cited

U.S. PATENT DOCUMENTS

| 4,566,066 A * | 1/1986 | Towers | 705/36 R |
| 6,161,098 A * | 12/2000 | Wallman | 705/36 T |
| 7,031,937 B2 * | 4/2006 | Brown et al. | 705/36 T |

OTHER PUBLICATIONS

GainsKeeper—Making Investing & Capital Gains Reporting Easy, "Frequently Asked Questions", www.gainskeeper.com of Mar. 3, 2000 and links circa 1999, (found on www.archive.org, on Aug. 19, 2007), pp. 1-4.*
IRS Publication 564 Mutual Fund Distributions for Use in Preparing 1998 Returns—Department of the Treasury, Internal Revenue Service, (hereinafter, Mutual Fund).*
Stock Split Does Become Math Exercise, Matthew Lubanko, The Hartford Courant, Dec. 6, 1998.*

* cited by examiner

*Primary Examiner* — Hani M Kazimi
*Assistant Examiner* — Kellie Campbell
(74) *Attorney, Agent, or Firm* — The Noblitt Group, PLLC

(57) ABSTRACT

A computer-implemented method and apparatus for determining a cost basis associated with a plurality of shares of a security. In response to information identifying an issuer, the purchase date and the sale date, a list of capital events that occurred in connection with the security between the purchase date and the sale date is retrieved from a database. One or more shares held adjustment ratios are then retrieved from a database. Each of the shares held adjustment ratios corresponds to one of the capital events that occurred in connection with the security between the purchase date and the sale date. A current cost basis associated with the security may then be determined in accordance with the one or more cost adjustment ratios and the purchase price per share of the security.

30 Claims, 15 Drawing Sheets

FIGURE 1

Investment Symbol [ ]   Or   CUSIP [ ]

Symbol Look-up

Purchase Price (If Known)

Date Acquired [ / / ]   (Enter the year, month, date, if known, or select UNKNOWN to use Average Price for a month or year)

Unknown

Begin Year [ ]   ▶ Begin Month [ ]   ▶ Begin Day [ ]

End Year [ ]   ▶ End Month [ ]   ▶ End Day [ ]

Please Note: Shares Acquired on Different Dates Must Be Calculated Seperately

Original Number of Shares Purchased [ ]

FIGURE 2

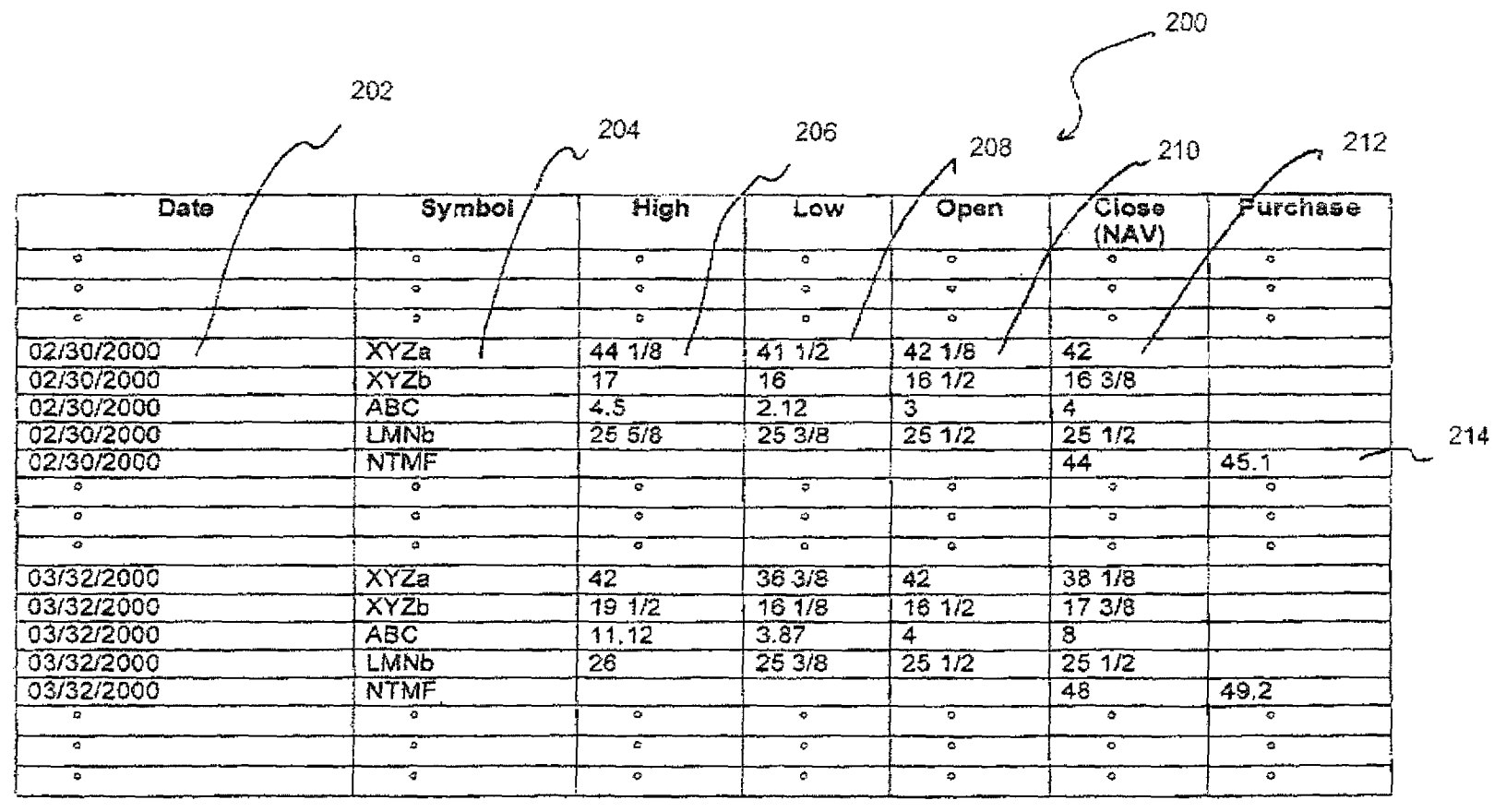

| Date | Symbol | High | Low | Open | Close (NAV) | Purchase |
|---|---|---|---|---|---|---|
| 02/30/2000 | XYZa | 44 1/8 | 41 1/2 | 42 1/8 | 42 | |
| 02/30/2000 | XYZb | 17 | 16 | 16 1/2 | 16 3/8 | |
| 02/30/2000 | ABC | 4.5 | 2.12 | 3 | 4 | |
| 02/30/2000 | LMNb | 25 5/8 | 25 3/8 | 25 1/2 | 25 1/2 | |
| 02/30/2000 | NTMF | | | | 44 | 45.1 |
| | | | | | | |
| 03/32/2000 | XYZa | 42 | 36 3/8 | 42 | 38 1/8 | |
| 03/32/2000 | XYZb | 19 1/2 | 16 1/8 | 16 1/2 | 17 3/8 | |
| 03/32/2000 | ABC | 11.12 | 3.87 | 4 | 8 | |
| 03/32/2000 | LMNb | 26 | 25 3/8 | 25 1/2 | 25 1/2 | |
| 03/32/2000 | NTMF | | | | 48 | 49.2 |

FIGURE 3

| Name | Symbol | Date | Type | SHAR1 | Rel. Share1 | SHAR2 | Rel. Share2 | SHAR3 | Rel. Share3 | Dist. Amt. |
|---|---|---|---|---|---|---|---|---|---|---|
| S1 | ABC | 01/7/99 | Spin Off | 2 | XYZ | - | - | - | - | - |
| S1 | ABC | 06/30/99 | Split | 3 | - | - | - | - | - | - |
| S1 | ABC | 07/30/99 | Merger | .5 | ABCXYZ | - | - | - | - | - |
| S2 | XYZ | 12/28/99 | Dist./Re. | 1 | - | .5 | PDQ | - | - | .05/sh |
| S3 | NOP | 04/26/00 | Delist | 1 | - | - | - | - | - | - |
| O5 | SVO | 08/25/00 | Expir. | 1 | - | - | - | - | - | - |
| M7 | YB | 09/01/00 | Dist./Re. | 1.025 | - | - | - | - | - | - |
| S1 | ABC | 10/01/00 | Merger | 2 | - | - | - | - | - | - |
| S9 | NOP | 10/02/00 | Relist | 1.0 | - | - | - | - | - | - |
|  |  |  |  |  |  |  |  |  |  |  |
|  |  |  |  |  |  |  |  |  |  |  |

| Investment Name | Inv. Type | Investment Symbol | CUSIP Number | Begin Trading Date | End Trading Date | Correlation Value |
|---|---|---|---|---|---|---|
| XYZ Company | Eq. Sh. (Pref.) | XYZa | XXXXXX | 01/01/96 | | |
| XYZ Company | Eq. Sh. (Comm.) | XYZb | YYYYYY | 01/01/96 | | |
| ABC Company | Eq. Sh. (Comm.) | ABC | ZZZZZZ | 01/22/95 | 06/04/99 | |
| LMN Corp. | Bond | LMNb | WWWWWW | 08/25/98 | | |
| Networth Technology | Mutual Fund | NTMF | UUUUUU | 04/26/98 | | |

402 — Investment Name
404 — Investment Symbol
406 — CUSIP Number
408 — End Trading Date
410 — Correlation Value
400

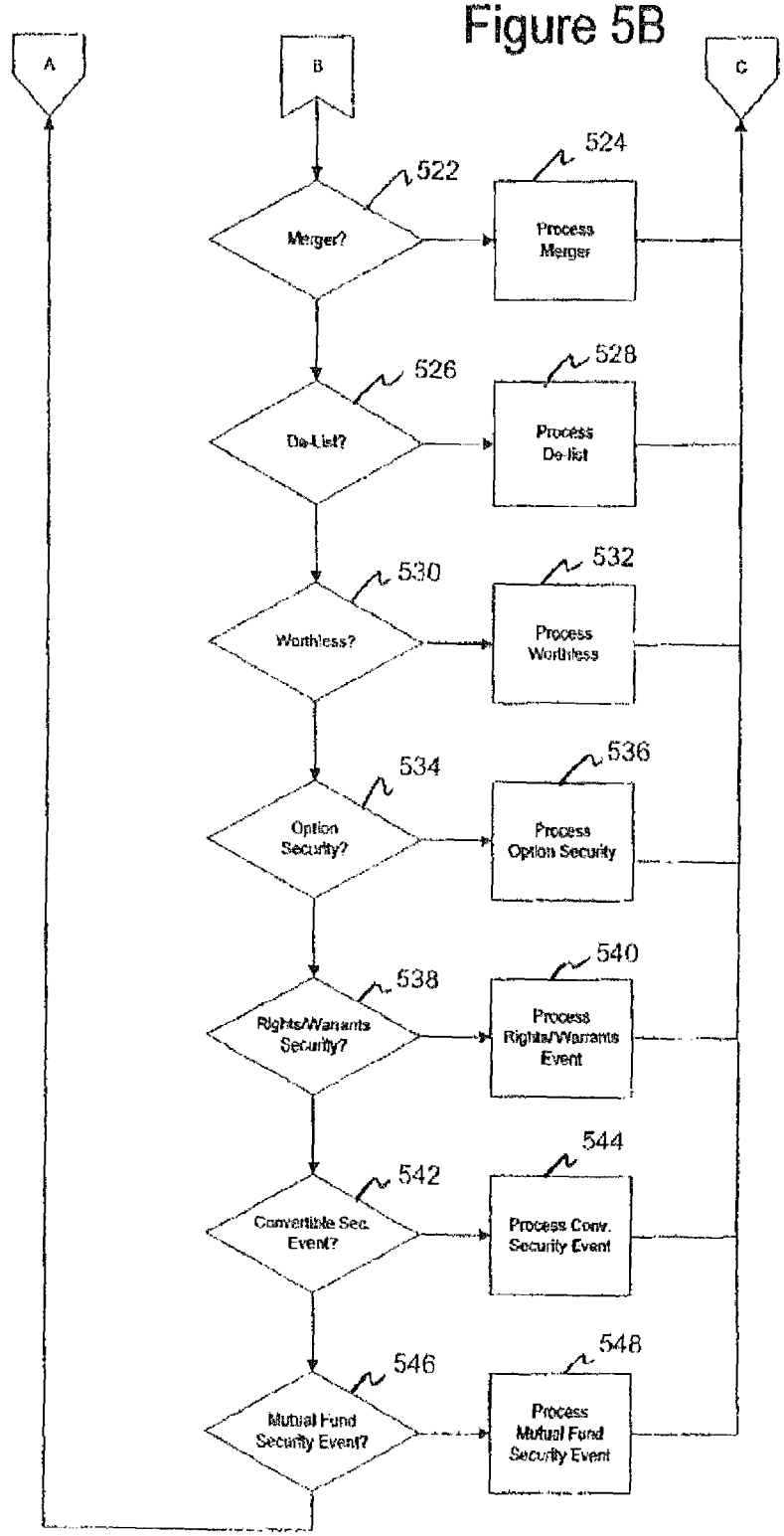

COMPUTER-IMPLEMENTED METHOD AND APPARATUS FOR ADJUSTING THE COST BASIS OF A SECURITY

CROSS-REFERENCES TO RELATED APPLICATIONS

This application is a continuation of U.S. patent application Ser. No. 12/505,418, filed on Jul. 17, 2009, entitled COMPUTER-IMPLEMENTED METHOD AND APPARATUS FOR ADJUSTING THE COST BASIS OF A SECURITY, which is a continuation of U.S. patent application Ser. No. 09/844,198, filed on Apr. 27, 2001, entitled COMPUTER-IMPLEMENTED METHOD AND APPARATUS FOR ADJUSTING THE COST BASIS OF A SECURITY, which claims priority from the provisional U.S. Patent Application No. 60/200,088, filed Apr. 27, 2000 and incorporates the disclosure of such applications by reference. To the extent that the present disclosure conflicts with any referenced application, however, the present disclosure is to be given priority.

BACKGROUND OF INVENTION

Anyone that prepares their own tax returns can appreciate the difficulty in determining the gain or loss associated with, for a simple example, a mutual fund that has accrued reinvested dividends over a period of time. In such a reinvestment situation, each time the mutual fund declares a dividend, additional shares in the find are purchased using the dividend amount and these additional shares are added to the investor's holdings. Typically, the price at which the additional shares are purchased using the dividends will differ from the purchase price of the original shares. When the investor later sells his/her holdings, the purchase price of different groups of shares held by the investor will therefore typically be different, as such groups of shares were purchased at different times. In order to properly calculate the gain or loss associated with the transaction, an investor must typically review all past statements associated with the mutual fund, associate the original purchase price with the originally purchased shares, a second purchase price with the shares resulting from the first dividend reinvestment, a third purchase price with the shares resulting from the next dividend reinvestment, and so on. Then, for each group of shares with a given purchase price, the investor must calculate the gain/loss for each group of shares. Thereafter, the individual must aggregate the gain/loss amounts for all such groups to determine the total gain/loss for the investment. This is a tedious and time-consuming process that includes multiple possibilities for accounting errors that can result in an incorrect determination of the gain/loss associated with the investment. Other capital events, such as stock-splits, spin-offs and mergers, present similar difficulties.

It is an object of the present invention to provide a system and method that ameliorates the above difficulties by automatically adjusting the cost basis associated with the purchase of an investment so as to compensate for capital events such as dividend reinvestments, stock-splits, spin-offs, and mergers that occur while such investment instruments are held by an individual.

This and other objects of the invention will become apparent from the description that follows.

SUMMARY OF THE INVENTION

The present invention is directed to a computer-implemented method and apparatus for determining a cost basis associated with an investment. The investment may be in the form of a security or securities with which capital events can be associated. The term "security" is hereinafter used to refer to all investments having capital events, and include investments traded in individual units such as shares as well as investments identified based on a face amount, purchase amount, or other method for defining the value of the investment. Information identifying an issuer associated with the security, parameters such as, but not limited to, a purchase date of the security, a number of shares of the security purchased on the purchase date, and a sale date of the security may be entered into a computer system. A purchase price for the security on the purchase date may be retrieved from a database coupled to the computer system or from a user of the computer system. Alternatively, a purchase price for the security corresponding to the amount paid by the purchaser may be entered. Next, in response to the information identifying the issuer, the purchase date and the sale date, a list of capital events that occurred in connection with the security between the purchase date and sale date may be retrieved from the database. The list of capital events includes at least one event selected from the group consisting of a distribution reinvestment event, a spin-off event, a merger event, and a split event. The database stores past price information and capital events for a plurality of different of securities associated with different issuers. The plurality of different securities for which information is stored in the database may include, for example, common stocks, mutual funds, options warrants, and closed end bond funds. Shares held adjustment ratios related to one or more events may also be retrieved from the database. The term "Shares Held Adjustment Ratio" is used to refer to an investment quantity factor reflecting a quantitative change in the holding of an investor, and is not limited to investments traded as shares, but includes all investments having some measure of quantity. Each of the shares held adjustment ratios may correspond to a capital event that occurred in connection with a security between the purchase date and the sale date. A current cost basis associated with the security may then be determined.

In a preferred embodiment, a current cost basis associated with a security is determined initially by applying a first shares held adjustment ratio associated with an event to the purchase price per share of the security. If multiple shares held adjustment ratios were retrieved from the database, then intermediate cost bases may be determined by iteratively and cumulatively applying factors associated with capital events to the basis of the investment until a final basis is determined. In this preferred embodiment, the cost adjustment information associated with each event retrieved from the database has an event date associated therewith and is applied to the current cost basis in a chronological order such that the cost adjustment information associated with the latest capital event date is applied in the final iteration of the process.

In accordance with a further aspect, the shares held basis adjustment ratio associated with each stock-split event stored in the database corresponds to a number of additional shares of a given security issued for each share of the given security held prior to such stock-split event; the shares held adjustment ratio associated with each merger event stored in the database corresponds to a number of shares of a security associated with a merged entity issued for each share associated with an issuer that merged into the merged entity; and the shares held basis adjustment ratio associated with each spin-off event stored in the database corresponds to a number of shares of a security associated with a spun-off entity issued for each share associated with an issuer that divested the spun-off entity.

In accordance with a still further aspect, the database stores the capital events for the plurality of different securities in a first table. For each capital event stored in the first table, the database may include fields corresponding to the stock symbol of the company associated with such capital event, a date of such capital event, a type of such capital event, a shares held adjustment ratio associated with such capital event, and where applicable, the company's role in such capital event, the company's partner in such capital event and the subscription rate in such capital event.

In addition, for each company or security that contains a capital event stored in the first table, the database may include a second table that contains fields for the name of the company, a stock symbol associated with the company, a CUSIP number associated with the company, a begin and end date for when such company first and last traded in the market and a field that stores a value correlating the stock symbol associated with such company. The value correlating the stock symbol, company name and CUSIP number may be used to identify an issuer associated with a given security in the database as such company undergoes merger events, spinoff events and name change events.

In accordance with a still further aspect, the database may store price information for each of the plurality of securities in a third table. For each date for which price information is stored in the third table, the database may store a company identifier, a high price, a low price, an open price and a close price for each of the plurality of securities referenced in the database.

In accordance with a still further aspect, the database stores a complete list of all the companies of securities that once traded on any of the exchanges and have later filed for bankruptcy and/or have been delisted from the exchange from which it traded. The capital events in connection with each of the defunct companies will also be stored in the database. The computer system will trace the history (if any) of capital events of any given defunct company and provide the necessary information so that the investor has the information needed to determine the worthlessness of the security.

In accordance with a still further aspect, the database may store a list of the high/low closing and opening prices of all equity and index options that once traded on an exchange. If the investor is not aware of the exact date of when an option was either purchased or sold, the system may search for an average. The cost basis of an option in connection with/without its underlining security may be determined based on whether the option was exercised, expired, or the position was closed in the market. If a purchased call or put were sold on the exchange prior to expiration, the system could automatically determine the difference between the cost and the amount received as either a long-term or short-term capital gain or loss, depending on the holding period.

In accordance with a still further aspect, the database may store a list of rights or warrants of underlying securities on exchanges. If an investor is not aware of an exercise price, cost basis or issue date of a warrant/rights offering, the system may search the database for the information requested by the user. In retrieving the adjusted cost basis of a stock and stock rights, the system may automatically determine whether the stock rights were taxable or nontaxable.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 1 depicts a graphical user interface for inputting information such as an issuer associated with a given security, a purchase date of the security, a number of shares of the security purchased on the purchase date, and a sale date of the security into a computer system, in accordance with a preferred embodiment of the present invention.

FIG. 2 depicts an exemplary portion of a database table for storing price information for each of a plurality of different securities over a given period of time.

FIG. 3 depicts an exemplary portion of a database table for storing information identifying capital events that have occurred over a given period of time in connection with various securities such as those listed in the database table of FIG. 2.

FIG. 4 depicts an exemplary portion of a database table for storing association information identifying securities.

FIGS. 5A and 5B is a flow diagram showing the overall operation of a software system for determining a cost basis associated with a security, in accordance with a preferred embodiment of the present invention.

DETAILED DESCRIPTION OF EXEMPLARY EMBODIMENTS

The present invention functions to ascertain the historical cost basis of investments, including but not limited to stocks, bonds and mutual funds, and can be implemented remotely through, for example, the Internet or on a stand alone computer. By way of an overview, in the preferred embodiment, the present invention determines an accurate cost basis for a given investment regardless of the investment's history of capital changes such as stock splits, spinoffs, mergers, right offerings, original discount values, special dividends and distribution reinvestment options. The present invention calculates and displays the cost basis of a stock, a stock option, mutual fund or any other investment through an easy to use graphical user interface. The invention incorporates a database that accesses historical information for various securities including daily opening, high, low and closing prices, spin-offs, mergers, stock splits, rights offerings, right redemptions, special dividends, return capital, original issue discounts, and dividend reinvestment programs in multiple buying periods.

Figure 13:
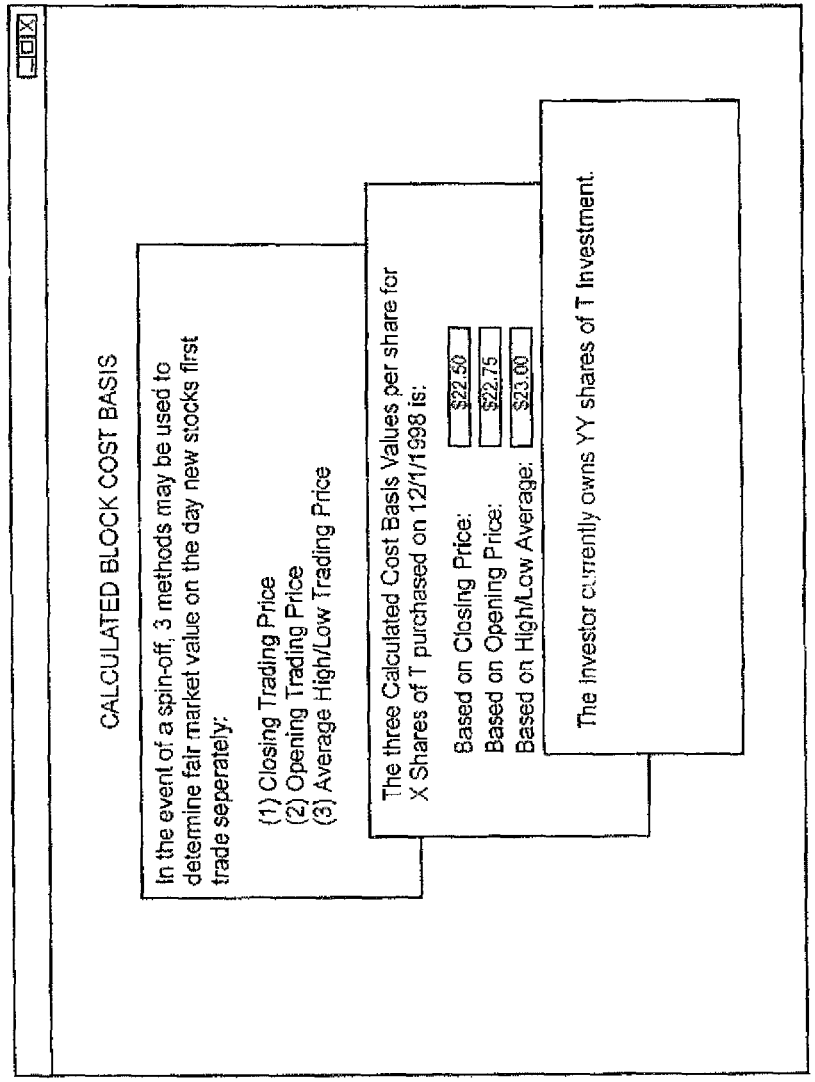
FIG. 13 depicts a graphical user interface for outputting the adjusted cost basis associated with a given security in response to the information inputted into the system via the graphical user interface shown in FIG. 1, in accordance with a preferred embodiment of the present invention.

In a preferred embodiment, after being provided with a company symbol or CUSIP number associated with a given investment (if not known, a directory of companies and their corresponding symbols are preferably automatically provided), the date of purchase or acquisition (if the precise date is not known, an average price for any given month or year can be provided), and the original number of shares purchased or acquired (such information is preferably entered using the screen shown in FIG. 1), the present invention automatically determines an adjusted cost basis per share and this information, together with an adjusted number of shares are provided to the user via a separate screen such as that shown in FIG. 13. Alternatively, a purchase price for a security may be provided by a user, especially where the purchase price of the security may vary through a purchase date. In order to determine the gain/loss associated with the transaction, the user can simply subtract the sale price of the shares associated with the investment (common to all shares sold) from the adjusted cost basis output of the present invention (this figure is also common to all shares associated with the transaction) to determine the gain/loss. On the cost basis screen shown in FIG. 1, the closing price on the date of purchase is made available to the user as a beginning reference point if needed, i.e., if the user does not have such information, the information may be automatically retrieved from a database, such as that shown in FIG. 2.

The present invention thus uses the information provided/retrieved in connection with the screen shown in FIG. 1 to automatically retrieve historical information associated with the security. The system may then locate the closing price on the purchase or acquisition data of the investment and compile forward any and all relative capital changes that would affect the basis of the investment. The system may distinguish among various types of capital changes and apply the correct adjustments to the investment's cost basis and number of shares accordingly.

Referring now to FIG. 2, there is shown an exemplary portion of a database table 200 for storing price information for each of a plurality of different securities over a given period of time in accordance with a preferred embodiment of the present invention. Database table 200 stores historical price information for each of a plurality of securities. For each date 202 covered by the database table 200, the database may store a high price 206, a low price 208, an open price 210 and a close price 212 for securities referenced in the database. Securities having a single price per day, such as mutual funds having a Net Asset Value at close of trading, may be reported by only the Net Asset Value, or by the Net Asset Value and a Sale Price 214 for the day. It will be understood by those skilled in the art that other database structures could be used for storing the information shown in FIG. 2, and that such modifications are within the scope of the present invention.

Referring now to FIG. 3, there is shown an exemplary portion of a database table 300 for storing information identifying capital events that have occurred over a given period of time in connection with the various securities listed in the database table of FIG. 2. Such capital events may include, for example, spin-offs, mergers, stock splits, rights offerings, right redemptions, special dividends, return capital, original issue discounts and dividend reinvestments. Database table 300 thus stores the capital events for the plurality of different securities in database table 200. For each capital event stored in the database table 300, the database includes fields corresponding to a name of a company 302 associated with such capital event, a stock symbol 304 associated with such capital event, a date 306 of such capital event, a type (e.g., dividend reinvestment, stock split, spin-off, etc.) of such capital event 308, a shares held adjustment ratio 310 associated with such capital event, and any other information desired to be associated with the capital event. Where a capital event involves multiple related shares, additional ratios 312 and related shares values 314 can be included.

Referring now to FIG. 4, there is shown an exemplary portion of a database table 400 for associating investment names. The table may contain fields identifying the name of an investment 402, a symbol 404 associated with the investment 402, a CUSIP number 406 associated with the investment 402, a begin date 408 and an end date 410 for when such company first and last traded, and a field that stores a value correlating an investment when said investment is associated with multiple issuers, symbols, or CUSIP numbers.

In the preferred embodiment, database tables 200, 300, and 400 store past price information and capital events for a plurality of different securities associated with different issuers. The plurality of different securities for which such information is stored in the database includes, for example, common stocks, mutual funds, closed end bond funds, and options.

The shares held adjustment ratio stored in the database for a given capital event reflects the type of the capital event and the financial particulars associated with the given capital event. The following examples demonstrate how the cost basis is determined for some of the different capital events that are processed by the present invention:

Example 1

Spin-Off Event

The ABC company has outstanding Common Stock. On Jun. 30, 1999, the ABC Company spins off a subsidiary named the XYZ Company for a 2-to-1 ratio. As a result of this spin-off event, for every 1 share of ABC Common Stock held by an investor, the investor will receive 2 shares of the new XYZ Company. Thus, an investor that holds 100 shares of the ABC Company prior to the spin-off will receive 200 shares of the XYZ Company and, following the spin-off, the investor will hold his original 100 shares of ABC Common Stock and 200 shares of the XYZ Company. The shares held adjustment ratio stored in the database for this capital event corresponds to the number of shares of the spun-off entity (e.g. the XYZ Company) issued for each share associated with the company that divested the spun-off entity (e.g., the ABC Company). In this example, the shares held adjustment ratio stored in the database for the capital event would therefore equal 2.0, while the records associated with the original ABC Common Stock would also reflect a name association with the new XYZ Common Stock.

For example, if an investor had purchased 100 shares of ABC company stock on Jan. 1, 1999 for $10 per share, and the values of ABC and XYZ stock were $5.00 and $2.50 per share respectively. The total basis ($1000) associated with the shares purchased on Jan. 1, 1999, would have to be distributed between the new ABC and XYZ shares, dependant on the relative values of the shares at the time of the spin-off. The weighted values of the shares at the time of distribution, along with the distribution ratios, would yield the cost basis allocation associated both with the original shares of ABC and for the new shares of XYZ.

A basis allocation ratio associated with the original shares could be calculated by dividing the value per share of the ABC shares at the time of the spin-off divided by the sum of the values associated with each share resulting from the spin-off. For example, as obtained from reference to a database, the prices for the ABC and XYZ shares, referred to hereafter as pABC and pXYZ respectively, could be $5.00 and $2.50. As such, the allocation ratio for the ABC stock utilizing the shares held ratios (nABC and nXYZ) in conjunction with the price information can be written as:

$$AR_{ABS} = \frac{pABC}{(nABC * pABC) + (nXYZ * pXYZ)}$$

Substituting the known values for the example yields an allocation ratio of 0.50. Applying this ratio to the basis per share of the originally held ABC common stocks would yield a basis per share of $5.00. An allocation ratio for the new XYZ common stock could be similarly determined, with an allocation ratio of 0.25 being determined. Applying the allocation ratio to the basis per share of the original ABC common stock would yield a basis per share of $2.50 per share of XYZ common stock.

Example 2

Stock-Split Event

The ABC company has outstanding common stock. On Jun. 30, 1999, the ABC Company splits its shares in a 3-for-1 stock-split. As a result of this stock-split, for every 1 share of ABC common stock held by an investor prior to the stock split, the investor will receive an additional 2 shares of common stock of the ABC Company. Thus, an investor that holds 100 shares of the ABC Company prior to the stock-split will receive 200 further shares of the ABC Company as a result of the stock-split. Following the stock-split, the investor will hold his/her original 100 shares of ABC Common Stock and 200 further shares of the ABC Company. The shares held adjustment ratio stored in the database for this capital event may be determined as follows:

SHAR=(number of shares issued per share)+1.0

In this example, the shares held adjustment ratio stored in the database for this capital event would therefore equal 3.0. A basis allocation ratio would simply be $1/(nABC)$ or 0.333. Applying this allocation ratio to the prior basis per share would thus distribute one-third of the prior basis per share to each share held after the split.

Example 3

Merger Event

The ABC company has outstanding Common Stock. On Jul. 30, 1999, the ABC Company merges with the XYZ Company on a 2 for 1 ratio. As a result of this merger, for every 2 shares of ABC Common Stock held by an investor prior to the merger, the investor exchanges such shares for 1 share of Common Stock of the merged ABC/XYZ Company. Thus, an investor that holds 200 shares of the ABC Company prior to the merger will exchange such shares for 100 shares of the merged ABC/XYZ Company and, following the merger, the investor will hold only 100 shares of the merged ABC/XYZ Company (and none of his/her original 200 shares of ABC Common Stock). The shares held adjustment ratio stored in the database for this capital events a number of shares of a security associated with the merged entity (e.g., the ABC/XYZ Company) issued for each share associated with an issuer (e.g., the ABC Company) that merged into the merged entity. In this example, the shares held adjustment ratio stored in the database for this capital event would therefore equal 0.5. An association between the identity of the ABC shares held before the merger with the XYZ shares post merger would also be created.

Example 4

Distribution Reinvestment Event

A distribution of dividends or capital gains allocations from a stock or mutual fund may result in the acquisition of additional shares of the stock or mutual fund through a distribution reinvestment. The distribution is generally taxable at the time it issues (unless held as part of a deferred income plan such as an IRA), and as such can affect the basis of the underlying investment from which the distribution was issued.

For example, an investor may have purchased 100 shares of XYZ stock at $10 per share on Jan. 1, 1999. On Dec. 28, 1999, the XYZ company may have issued a dividend of $0.50 per share, which the investor may have elected to have reinvested. The cash value of the distribution to the investor would have been $50. If the per share price of the investment on Dec. 28, 1999 was $12.50 per share, the reinvestment would have resulted in the purchase of an additional 4 shares of XYZ. As such, a shares held adjustment ratio of 1.04 would be stored, determined by dividing the distribution per share by the price per share at the time of the distribution, and adding one (representing each originally held share) to arrive at a shares held adjustment ratio.

Alternatively, a shares held adjustment ratio could be determined without directly retrieving a SHAR value from the database. Since the SHAR value can be readily determined from the distribution amount and purchase price on the day of the distribution. SHAR can be calculated as:

SHAR+(DIST)(PricePerShare)

The timing of the sale of the shares of the XYZ company may impact the tax consequences of a sale of the shares. As such, the purchase date of each group of shares may need to be remembered for reporting purposes at a later date. Accordingly, the basis of the shares can be tracked per group or aggregated.

If the basis is to be tracked for each group of XYZ stock based on its purchase date, a distribution reinvestment event would cause a shares held adjustment ratio of 1.0 to be applied to the quantity of the shares held immediately prior to the distribution event, as well as the creation of a new group of shares (purchased on the date of the distribution event), where the basis for the new group would be determined by the purchase price of the shares. As such, no allocation ratio would need to be applied to either group of shares, as the basis for the originally held shares would not change, while the basis for the newly acquired shares would be the price of the shares at the time of the reinvestment.

Alternately, where distributions of more than one type occur on the same day, a distribution reinvestment event could include a dividend distribution as well as a capital gain distribution. It will be understood by those skilled in the art that such a distribution could be treated as a single distribution event, or as multiple distribution events based on the type of distribution which has occurred.

Example 5

Worthless Security Event

For this example, assurance the ABC Company was delisted from the New York Stock Exchange in 1997, and afterwards filed for bankruptcy two years later. The investor who purchased the now defunct company stock before 1997 may not be aware of this recent development. In order for the investor to write off the investment in the year the company filed for bankruptcy (an IRS requirement to approve the write-off), proof of the investment's worthlessness is necessary. The investor may use the database by either entering the company's name, stock symbol or CUSIP number and the software may search the database to identify the capital change history of the defunct company. If the investment is worthless in value, the system will identify it and a pop-up window will appear and provide the user with important information needed to write-off the investment. The pop-up window can identify when the security was delisted from the exchange it traded on and (if) when the company went bankrupt or was liquidated.

A simple delisting of an investment generally means that the market price of an investment has dropped below a value criteria established by an exchange. The investment does not necessarily lose value, nor is the basis or number of shares held adjusted by the event. As such, a delisting event may have a shares held adjustment rate of 1 associated with the event.

A liquidation type bankruptcy may result in the value of investments becoming zero. This is particularly the case with equity investments, such as common stocks. The basis in the shares does not change, nor does the number of shares held. As such, the shares held adjustment ratio associated with such an event would be 1. This is a worthless security event.

Other forms of bankruptcy may also occur, such that the event associated with the bankruptcy may be comparable in form to a merger or split event. Such a situation arises where originally held investments are converted to a newly issued investment at a discounted rate. Such an event may occur as part of a reorganization bankruptcy. For example, as a means for gaining shareholder approval for a reorganization plan, the shareholders may be offered a fractional amount of stocks in a reorganized company in exchange for ratification of the reorganization plan. The basis of the originally held shares may either be fully associated with the new shares, or may be separated as a capital loss associated with the event.

Example 6

Put Options

On Apr. 11, 2000, an investor sold an ABC May put options at a strike price of $50 per share for a premium of $2.00 per share.

In May, the ABC put options were exercised due to the underlying stock reaching $50 or higher. The investor retains the premium, however, must purchase the underlying ABC stock at the strike price.

The investor may use the application and database to determine the accurate cost basis for her ABC stock. The system will automatically deduct the amount of the premium received by the investor from the security's purchase price. The adjusted cost basis for the ABC stock is then determined to be $48 per share.

The system will also automatically determine an accurate cost basis for the other side of the transaction as well. For example, the investor who brought the ABC put options at the strike price of $50 per share for $2.00 can also retrieve an adjusted cost basis using the database system. The application can determine the amount realized on the sale of the ABC stock by deducting the premium paid when the option was exercised. The system will then determine that the adjusted cost basis for the ABC stock is also $48 per share.

Example 7

Options (Calls/Puts) with Stock

On Jan. 1, 2001, an investor purchased 200 shares of XYZ Company common stock at a price of $25 per share for a total cost of $5,000. The investor also sold an XYZ February covered call option at a strike price of $35 per share for a premium of $1.50 per share. The investor received a premium total of $300 for the covered call option sold.

In February, the XYZ covered call options were exercised when the underlying XYZ stock reached $35 or higher. The investor retained the premium of $300, however, must sell the XYZ stock at a price of $35 per share.

The investor may use the application and database to determine the accurate cost basis for his XYZ stock coupled with the covered call option as a combined investment strategy. The system will automatically apply the premium received by the investor and add that amount to his/her original cost basis of $5,000. The adjusted cost basis for XYZ is then determined to be $5,300 or $26.50 per share.

The system will also automatically determine an accurate cost basis for the other side of the transaction as well. For example, the investor who brought the 200 shares of the XYZ stock at the strike price of $35 per share can also retrieve an adjusted cost basis using the database system. The application can retrieve an accurate cost basis by applying the premium paid for the call option of $300 to the amount paid for the XYZ stock of $5,000. The system will then determine that the adjusted cost basis for the XYZ stock is also $5,300 or $26.50 per share.

Returning now to FIG. 4, for each capital event stored in table 400, the database further preferably includes a field that stores a value correlating the stock symbol and the CUSIP number associated with such capital event. The value correlating the stock symbol and the CUSIP number uniquely identifies an issuer associated with a given security in the database as such issuer undergoes historical capital changes such as merger events, spin-off events and name change events. The value correlating the stock symbol and the CUSIP number acts as a safeguard in the event the stock symbol and/or CUSIP no longer applies as a result of a historical capital change, and is particularly useful for tracking stocks that have undergone capital events such as name changes, mergers, obsolete securities (where an old ticker symbol previously associated with a given stock has been reassigned and/or where the CUSIP number previously associated with a given stock becomes obsolete), and when the security changes the exchange which it trades on (for example, from the NASDAQ to the NYSE).

An example of a name change occurred when International Harvester changed its name to Navistar. In this case, the stock symbol for the security changed. An example of a merger occurred when Travelers merged with Citicorp to form Citigroup. In this case, both the Citicorp and Travelers stock symbols were reassigned and Citigroup was assigned the old stock symbol for Chrysler (which was merged into Daimler Benz and hence ceased to exist under the name Chrysler.) The CUSIP numbers for these entities also changed as a result of these capital events. In the case of obsolete securities, the company symbols and CUSIP numbers are no longer used once the stock is delisted. Finally, when a security changes the exchange on which it trades, the company is assigned a new stock symbol and the old stock symbol previously used by the company is either no longer used or reassigned.

Accordingly, in the present invention, a value correlating the stock symbol and the CUSIP number (e.g., a 10 digit alpha numeric internal identification number) is preferably permanently assigned to every security referenced in the database. This internal identification follows the security through time in the database, where other tracking methods such as CUSIP's and stock symbols fail.

Figure 5A:
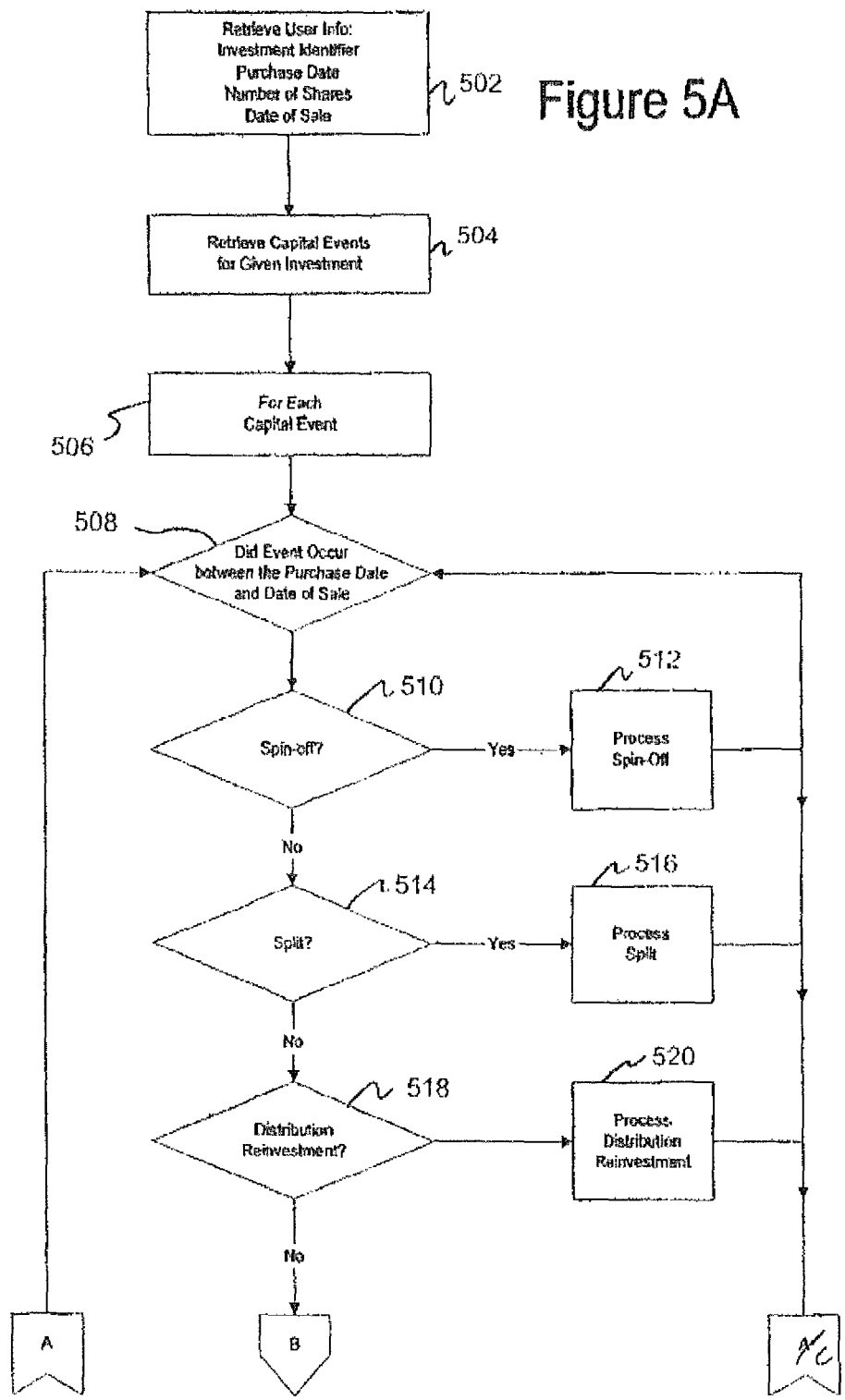

Referring now to FIGS. 5A and 5B, there is a flow diagram showing the overall operation of a software system 500 for determining a cost basis associated with a plurality of shares of a security, in accordance with a preferred embodiment of the present invention. In step 502, information identifying an issuer associated with the security, a purchase date of the security, a number of shares of the security purchased on the purchase date, and a sale date of the security is entered using, for example, the interface shown in FIG. 1. In step 502, a purchase price per share of the security on the purchase date is also either retrieved from database table 200 or from the user if the user has such information available. Next, in step 504, in response to the information identifying the issuer, the purchase date and the sale date (input in step 502), a list of capital events that occurred in connection with the security between the purchase date and sale date is retrieved from database table 300. One or more shares held adjustment ratios are also retrieved from the database in step 504. Each of the shares held adjustment ratios corresponds to one of the capital events that occurred in connection with the security between the purchase date and the sale date. In steps 506-520, a current cost basis associated with the security may then be determined in accordance with the one or more shares held adjustment ratios and the purchase price per share of the security.

In a preferred embodiment, a current cost basis associated with the security is preferably determined (in steps 506-520) initially by applying a first shares held adjustment ratio to the purchase of the security. If multiple shares held basis adjustment ratios were retrieved from the database in step 504, then an intermediate cost basis may be assigned to be equal to the current cost basis. For each further shares held adjustment ratio retrieved from the database in step 504, the current cost basis is then adjusted again by applying a further shares held adjustment ratio to the intermediate cost basis. This process is then repeated until each further shares held adjustment ratio retrieved from the database has been used to adjust the current cost basis. In this preferred embodiment, each further shares held cost adjustment ratio retrieved from the database has an event date associated therewith and is applied to the current cost basis in a chronological order such that the cost adjustment ratio associated with a latest event date is applied in the final iteration of the process.

Although the above contemplates retrieving all capital events before applying them to the basis of a security, the capital events can be retrieved and applied sequentially for each capital event stored. The capital events should be applied chronologically to accommodate accounting and tax reporting requirements.

Thus, for example, if for a given investment four capital events occurred between a purchase date of Jan. 1, 1999 and a sale date of Dec. 31, 1999, i.e., a reinvested dividend on Jan. 13, 1999, a merger on Feb. 28, 1999, a stock-split on Mar. 31, 1999 and a spin-off on Apr. 30, 1999, then in step 504, a list of four capital events would be retrieved from database table 300. In addition, four shares held adjustment ratios (each corresponding to one of the four capital events) would also be retrieved from the database. In the steps that follow, the current cost basis associated with the security would then be determined in accordance with the four shares held adjustment ratios and the purchase price per share of the security. In particular, in this example, the current cost basis associated with the security would initially be adjusted (in step 520 which is used for processing dividend reinvestments) by applying the first shares held adjustment ratio associated with the first capital event to the purchase price per share of the security. Next, since multiple shares held basis adjustment ratios were retrieved from the database in step 504, an intermediate cost basis is assigned to be equal to the current cost basis. Thereafter, the current cost basis is adjusted again (this time in step 524 which is used for processing mergers) by applying the second shares held adjustment ratio associated with the second capital event to the intermediate cost basis. This process is then repeated until each further cost basis adjustment ratio retrieved from the database has been used to adjust the current cost basis. Accordingly, in the given example, the intermediate cost basis is reassigned to be equal to the current cost basis (as adjusted using the second shares held adjustment ratio), and the current cost basis is adjusted again (this time in step 516 which is used for processing stock splits) by applying the third shares held basis adjustment ratio associated with the third capital event to the intermediate cost basis. Finally, in the given example, the intermediate cost basis is reassigned yet again to be equal to the current cost basis (as adjusted using the third shares held adjustment ratio), and the current cost basis is adjusted again (this time in step 512 which is used for processing spin-offs) by applying the fourth shares held adjustment ratio associated with the fourth capital event to the intermediate cost basis. The current cost basis as adjusted using the fourth shares held adjustment ratio is then preferably output to a user via the screen shown in FIG. 10.

Figure 6:
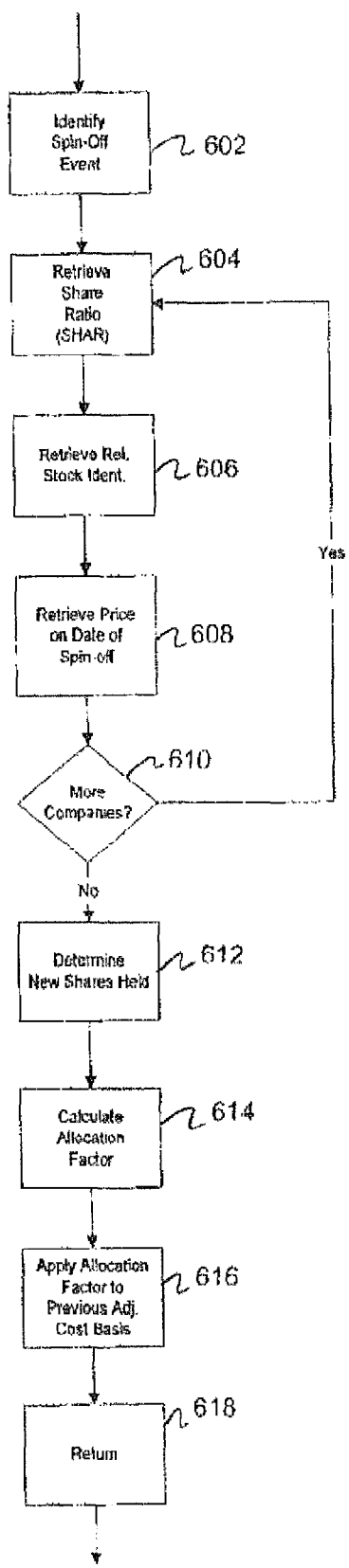
FIG. 6 is a flow diagram showing a system for adjusting the cost basis of a security that has undergone a stock spin-off event.

Referring now to FIG. 6, there is shown a flow diagram showing a system for adjusting the cost basis of a security that has undergone a stock spin-off event, in accordance with the present invention. FIG. 6 will be described using the following example: Company A spins off Companies B and C, and prior to the spin off, the investor's average cost basis for each share Common Stock of Company A was $5/share. For the new companies (i.e., Companies B and C), the day of the spin-off is deemed to be the day that the new company first traded separately. The average prices, at the time of the spin-off, are: Price for Company A Stock=pA=$4/share; Price for Company B Stock=pB=$3/share; and Price for Company C Stock=pC=$2/share.

In step 602, a spin-off event is identified. In Step 604, the process retrieves a first shares held adjustment rate ($SHAR_1$). In Step 606, the process retrieves an identifier for the related investment ($REL\ STOCK_1$) associated with the first shares held adjustment rate ($SHAR_1$). The process may then retrieve the prices of the shares on the spin-off date 608. If it is determined 610 that there are more spun off companies, the process may continue to retrieve shares held adjustment ratios and related investments until all spun off companies have been identified. At this point, the process will have accumulated all of the spin-off stock information. New shares held information can be determined 612 by multiplying each shares held adjustment ratio (SHAR$_1$, SHAR$_2$, . . . ) by the number of shares held prior to the spin-off event. Each new group of spin-off shares (SHAR$_1$*REL. STOCK1, SHAR2*REL. STOCK2, . . . ) may then be separated for further tracking A basis allocation factor for each group may be calculated 614 using weighted averages based on the number and values of the shares involved in the spin-off event. The allocation factors may then be applied 616 to the original basis to determine the basis in each group of shares.

Where the prices are for a mutual fund with a single price on a given day, the actual cost basis adjustment ratios for each of the Company A, B, and C investments can be stored. Where high, low, and average prices are being used to ascertain a strategy with the highest return to an investor, the individual prices per share (high, low, and average) may alternately be stored, with ratios calculated from the individual prices, or three cost basis adjustment ratios may be stored corresponding to a high strategy, a low strategy, and an average strategy.

For the values of Company A, B, and C shares described above, the cost basis adjustment ratio (in a form relating the basis per share after an event to the basis per share before the event) for the originally held shares in Company A could be calculated as:

$$CBAR_A = \frac{nA * pA}{(nA * pA) + (nB * pB) + (nC * pC)}$$

where nA, nB, and n$_C$ are the number of shares received per share of the investment which underwent the spin-off. Using pA=$4, pB=$3, and pC=$2, and assuming that one share of Company B and one share of Company C were distributed for each ten shares of Company A stock held (i.e., nA=1, nB=0.1, and nC=0.1), the value of CBAR$_A$ would be 0.8888. Applying this CBAR to the basis in the originally held shares of company A would yield a basis of $4.444 per share. By substituting pB, and pC into the numerator, cost basis adjustment ratios could likewise be determined for a basis in the newly held shares of Company B and C. Using the above values for pB and pC, CBAR$_B$ would be 0.0667, and CBAR$_C$ would be 0.0444. The basis for the newly held shares of Company B and Company C would be determined by applying the relevant CBARs to the original per share basis of Company A stock held.

Figure 7:
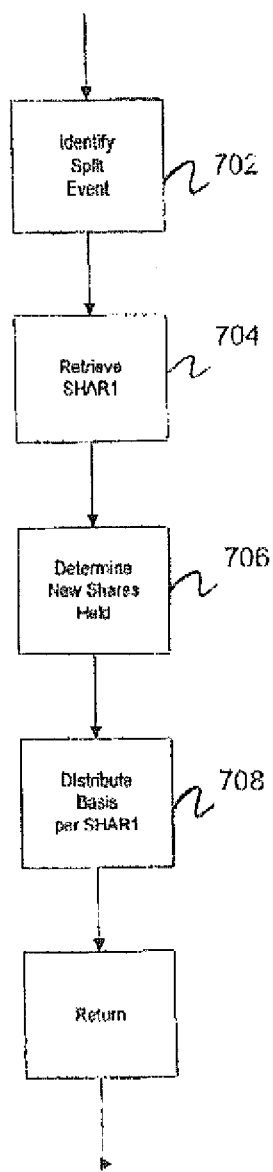
FIG. 7 is a flow diagram showing a system for adjusting the cost basis of a security that has undergone a stock split event.

Referring now to FIG. 7, there is shown a flow diagram showing a system for adjusting the cost basis of a security that has undergone a stock split event, in accordance with the present invention. In step 702, a split event is identified. In step 704, a shares held adjustment ratio (SHAR,) associated with the stock-split event is retrieved from database table 300. The number of shares held by the investor is then adjusted 706 based on the shares held adjustment ratio value. Thus, for example, if Company X had a 3-for-1 stock split, and an investor held 100 Shares of Company X prior to the stock split, the number of shares held by the investor would be adjusted by multiplying the previous shares held by the investor by the shares held adjustment ratio. In the example, the above shares held adjustment ratio would be 3 and the adjusted number of shares would therefore be equal to 300. In step 708, the cost basis of the investment per share is similarly adjusted by dividing the investor's average cost basis for each share Stock of Company X prior to the split by an allocation ratio as discussed above. In assessing the effect of the next subsequent capital event on the cost basis of the shares of Company X, the present invention will use the adjusted cost basis yielded by this step 708 as a new starting point and then adjust this value to reflect the effect of such further capital event.

Figure 8:
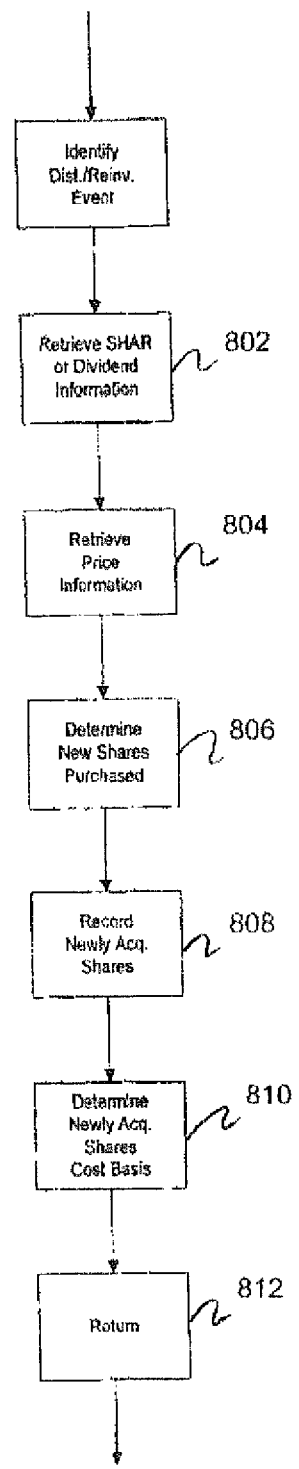
FIG. 8 is a flow diagram showing a system for adjusting the cost basis of a security that has undergone a distribution reinvestment event.

Referring now to FIG. 8, there is shown a flow diagram showing a system for adjusting the cost basis of a security that has undergone a distribution reinvestment event. FIG. 8 will be described using the following example: An investor owns 100 shares of Company Y stock, and prior to the dividend event, the investor's cost basis for each share was $5 per share. The investor's total basis for the 100 shares would therefore be $500. On Sep. 1, 2000, Company Y declared a dividend of $0.25 per share through a reinvestment plan, wherein the price per share of the Company Y stock at the time of the reinvestment was $10 per share. In connection with this example, a shares held adjustment ratio of 1.025 would be stored.

In step 802, the system retrieves the shares held adjustment ratio for the distribution event (which may be retrieved from Table 300), and, in step 804, the system retrieves from the database table 200 the reinvestment price of the stock (e.g., the Company Y shares, noted as rpY). From the shares held adjustment ratio (nY) and the reinvestment price (rpY), (which may be retrieved from table 200) the distribution per share (d/s) of the Company Y stocks may be determined:

$$d/s=(nY-1)*rpY$$

Alternately, the distribution per share value can be stored in table 300. In step 806, the number of newly acquired shares may be determined by applying the shares held adjustment ration minus one to the original number of shares held, or:

$$NewShares=(nY-1)*OriginalShares$$

In step 808, the new adjusted cost basis (NACB) per share may be determined by:

$$NACB = \frac{d/s + b/s}{nY}$$

Alternately, the new shares can be grouped 808 for further tracking, with the basis of the original shares unchanged, and set 810 the basis of the new shares equal to the purchase price of the new shares. In this situation, an average basis/share can be determined by summing the total basis associated with each group of shares, and dividing by the total number of shares. For the described example, the basis per share before the event plus the distribution per share would be $5.25, which when divided by the shares held adjustment ration (nY) would yield a $5.048 basis per share. The process must track the number of new shares, or the number of original shares and the group of new shares, through subsequent events.

Figure 9:
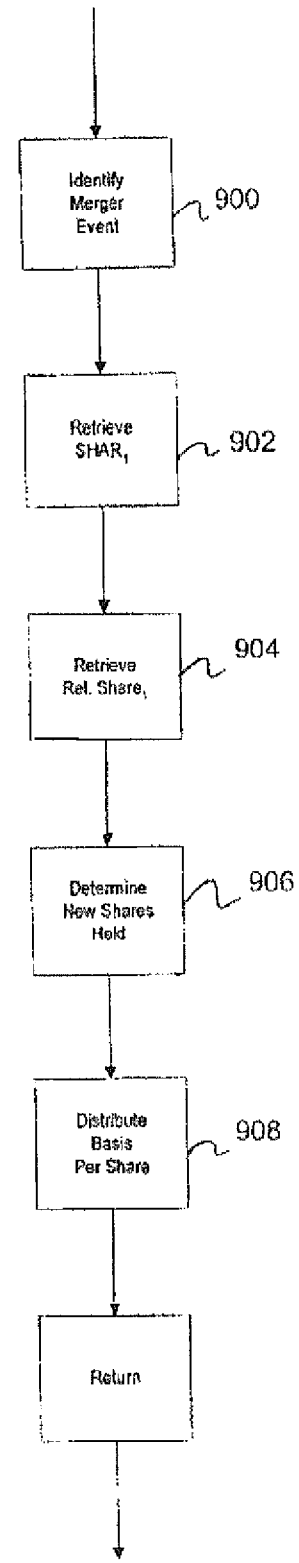
FIG. 9 is a flow diagram showing a system for adjusting the cost basis of a security that has undergone a merger event.

Referring now to FIG. 9, there is shown a flow diagram showing a system for adjusting the cost basis of a security that has undergone a merger event, in accordance with the present invention. FIG. 9 will be described using the following example: An investor owned 100 shares Company ABC, and prior to the merger event, the investor's average cost basis for each share Company A Stock was $5/share. Company ABC then merged into Company XYZ and every share of Company ABC stock was swapped for 2 shares of Company XYZ stock. The shares held adjustment ratio stored in the database 300 for this capital event would therefore equal 0.5. In step 906, a new number of shares (of Company B Stock) is determined by applying the shares held adjustment ratio (retrieved 902 from database 300) to the previous number of shares held by the investor.

In step 908, a new average cost basis per share may be determined by applying the reciprocal of the shares held adjustment ratio to the previous average cost basis per share of the investment ($5/share). Thus, the new average cost basis per share is:

New cost basis/share=$5/share*(½)=$2.5 per share

In assessing the effect of the next subsequent capital event on the cost basis of the shares of Company XYZ, the present invention will use the adjusted cost basis yielded by this step 908 as an intermediate value and then adjust this value to reflect the subsequent capital events. Since the company identifier will no longer exist after the merger, the system will track the basis of the shares by applying events associated with the newly held security.

Figure 10:
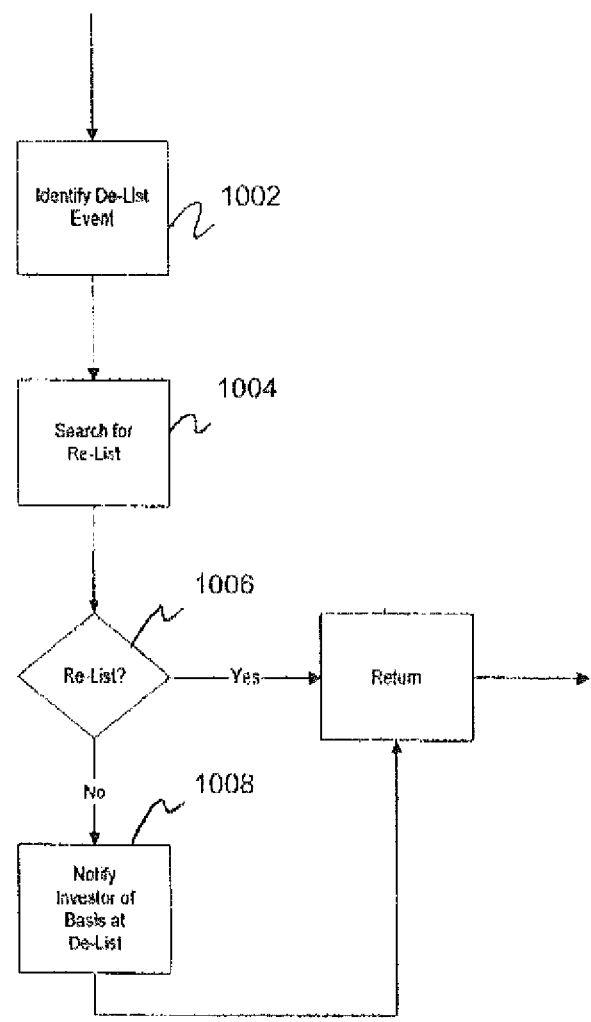
FIG. 10 is a flow diagram showing a system for adjusting the cost basis of a security that has undergone a delisting event.

Referring now to FIG. 10, there is shown a process for resolving a delisting event. Delisting events may be stored in Table 300. Once a delisting event has been noted 1002, the process may search forward 1004 to determine 1006 if the investment has been relisted. If it is determined 1006 that the investment has been relisted, the process may return to processing capital events. If it is determined 1006 that the investment has not been relisted, the process notifies 1008 the user of the delisting event, and the basis of the investment at the delisting date.

Figure 11:
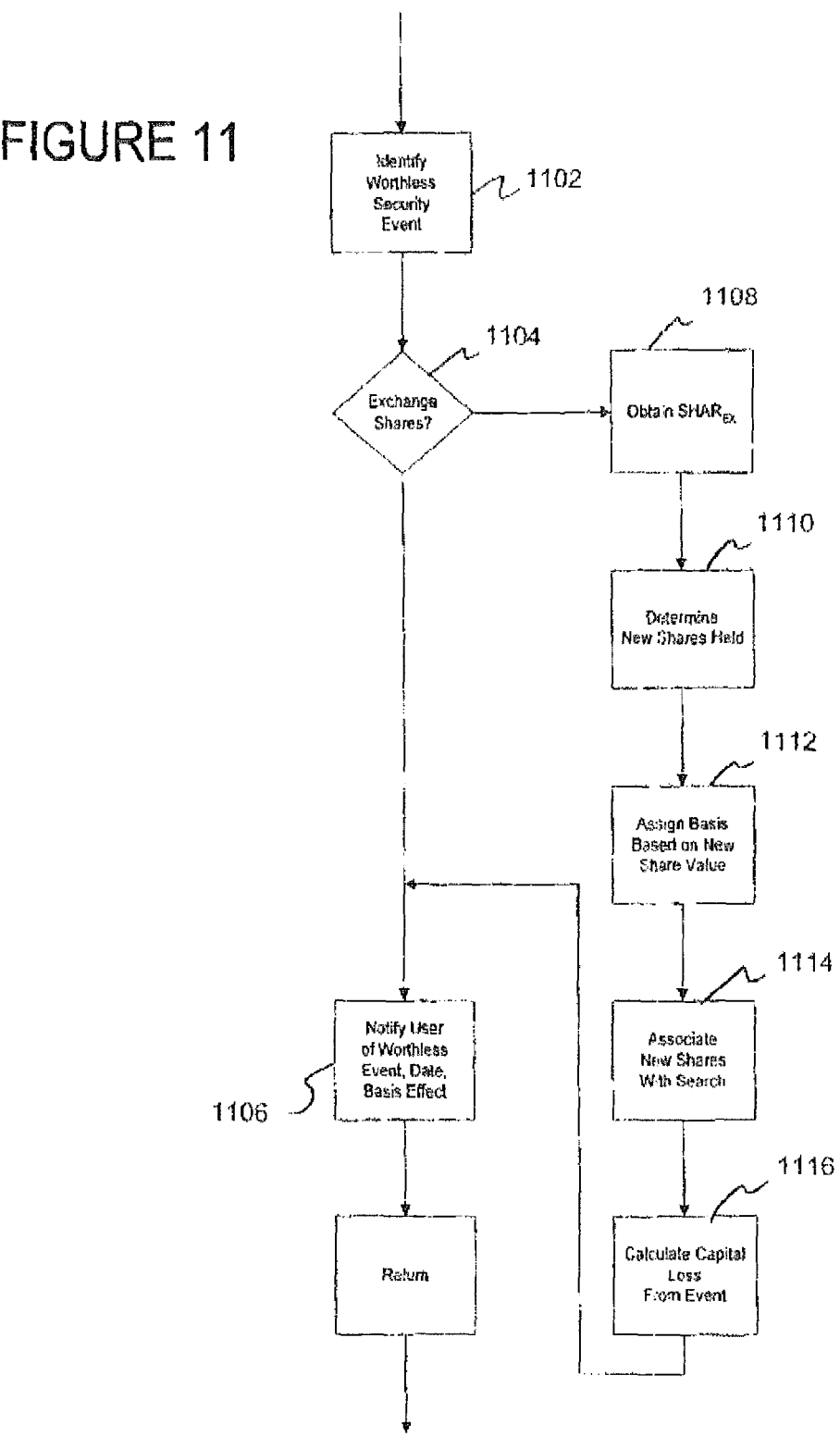
FIG. 11 is a flow diagram showing a system for adjusting the cost basis of a security that has undergone a worthless security event.

Referring now to FIG. 11, there is shown a process for resolving a worthless security event. Once a worthless security event has been identified 1102, the process may determine 1104 whether shares in a reformed company were exchanged for the worthless shares. If no shares were exchanged, the user may be informed 1106 of the worthless share event, the basis of the time of the event, and the date on which it occurred such that an investor can properly record a capital loss associated with the event.

If new shares were exchanged, a shares held adjustment ratio (SHARex) can be retrieved 1108, and a new shares held value may be determined 1110. The basis of the new shares held may be determined 1112 from the value of the shares on the exchange date. The new shares may then be associated 1114 with the basis calculation. A capital loss associated with the event can be determined 1116, and reported 1106 to the user.

Figure 12:
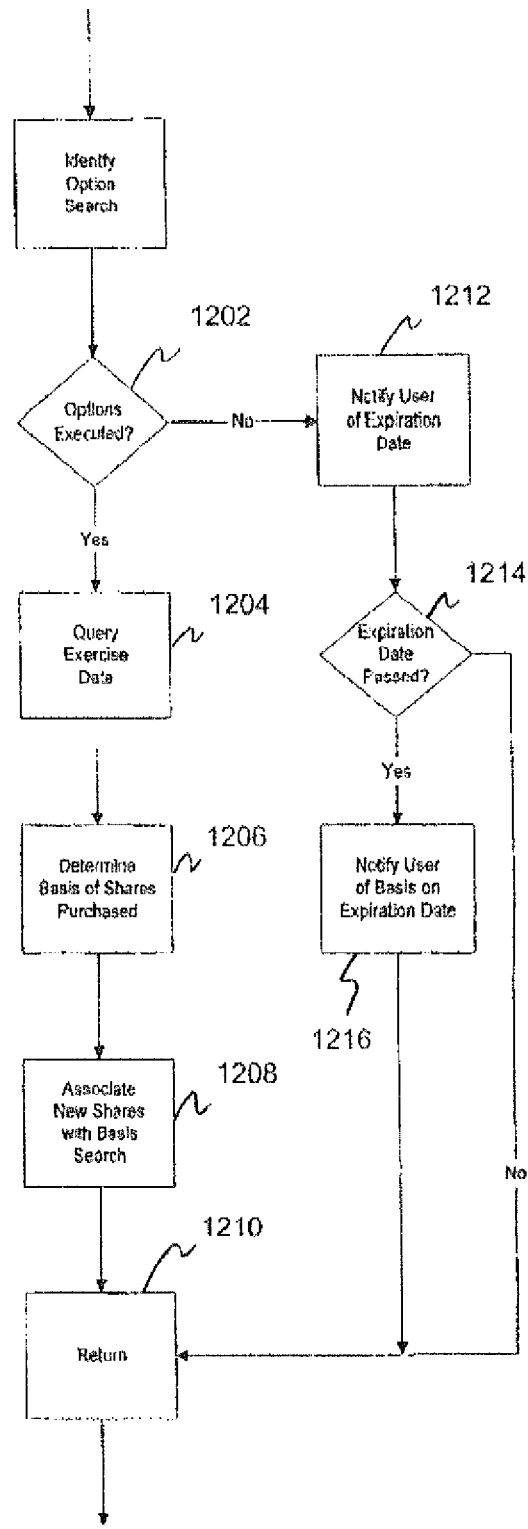
FIG. 12 is a flow diagram showing a system for adjusting the cost basis of an option security.

Now referring to FIG. 12, there is shown a process for handling option investments. In accordance with a still further aspect, the database may store a list of all high/low closing and opening prices of equity and index options traded on an exchange. An option is an instrument giving the holder the right to buy or sell an investment at a predetermined price. Accordingly, the instrument itself may be valued and traded on an exchange, as well as exercised. Such options may be characterized by the contracted investment price, as well as an expiration date after which the option cannot be exercised.

If an investor is not aware of the exact date on which an option was either purchased or sold, the system may search for average values.

The cost basis of an option is determined by its purchase price. The option may have a sale value associated, such that sale of the option or options results in a capital gain or loss, based on the sale price and basis in the held shares.

An option traded without being exercised may be treated similarly to other investment vehicles. The sale price minus the basis provides the determination of capital gain or loss. If the option expires, the option may become valueless, similar to a worthless stock event.

If the option is exercised, the effect is similar to a merger, in that the original option ceases to exist, but is replaced by the investment to which the option pertained. The execution of the option requires the purchase of the investment, albeit at the contract price. Once it has been identified (shown in FIG. 5B) that option shares are involved, the user can be queried 1202 to determine whether the option shares were executed, and if executed, queried 1204 for a date on which the options were exercised. If it is determined 1202 that the options were executed the basis of shares acquired by exercising the options can be determined 1206 by adding the purchase price of the shares to the basis of the options to determine the basis of the new shares. These new shares can then be associated 1208 with the basis tracking event, and the basis of the new shares tracked 1210. For the purposes of this discussion, it is assumed that the options cease to exist when exercised, such that the new shares would be tracked forwards.

If it is determined that the options were not exercised, the options would expire. Expiration of the options results in the options becoming worthless. In this event, the process user may be notified 1212 of the expiration date for the options, and if it is determined 1214 that the options have expired, notified 1216 of the basis of the options at the time of expiration, and the need to report the associated capital loss. Since no shares of a new investment were acquired, the process can end or return 1210. Returning 1210 would result in the same outcome, since no further capital events would exist for the expired options.

Where an investment has underlying rights or warrants, a capital event can occur when an investor exercises rights on warrants, either converting a presently held investment or exercising a right to purchase additional or different shares. These rights can either be associated with an investment when purchased or issued by a share issuer while held by an investor.

If stock rights were issued while held by an investor and were taxable, the system may determine the basis of the rights as the fair market value at the time of the distribution, and the basis of the underlying stock may remain the same. If the stock rights were nontaxable, the system could determine if the fair market value of the rights were more or less than 15% of the fair market value of the underlying stock. If the stock rights had a fair market value of 15% or more of the fair market value of the underlying stock, the system could then divide the adjusted basis of the underlying stock between the underlying investment and the investment rights. A verified ratio can be determined based on the fair market value of each of the underlying investments and the investment rights to the fair market value of both at the time of issuance of the rights or warrants.

If fair market value of the stock rights was less than 15%, the system will provide the user with both cost basis methods by determining the basis as zero or by dividing the basis of the underlining stock between the underlining stock and stock rights. If the stock rights were exercised, the system will determine the basis of the newly acquired stock. If the rights were sold on the exchange, the system will determine its basis as well. The holding period of that underling stock or of the original rights or warrants will also be calculated and displayed in the detail screen for tax purposes.

For example, suppose an investor owned 100 shares of ABC Company stock, which cost $22 per share. The ABC Company issued 10 nontaxable stock rights (0.1 stock right per share) that would allow the investor to buy 10 more shares at $26 per share. At the time the stock rights were issued, the stock had a market value of $30, not including the stock rights. Each stock right had a market value of $3. The market value of the stock rights was thus less than 15% of the market value of the stock and the investor could choose to divide the basis of the stock between the stock and the stock rights. The basis for the underlying stock and the stock rights would be as follows:

$$100 \text{ shares} \times \$55 = \$5,500, \text{ basis of underling stock}$$

$$100 \text{ shares} \times \$70 = \$7,000, \text{ market value of underlining stock}$$

$$10 \text{ stock rights} \times \$7 = \$70, \text{ market value of stock rights}$$

$$(\$7,000/\$7,070) \times \$5,500 = \$5,445.54, \text{ new basis of underlining stock}$$

$$(\$70/\$7,070) \times \$5,500 = \$54.46$$

Table 400 could also be used to store a list of convertible securities. The cost basis and holding period of convertible securities can be calculated the same way as other securities, from the day after the purchase trade date if the security is not converted. If a convertible bond is purchased and later converted into another security, the system may adjust the cost basis and holding period of the new security depending upon whether or not money was paid to affect the conversion.

If capital is not needed to affect the conversion, the system may automatically adjust the cost basis and the holding period of the new security to begin on the day after the original convertible security was purchased. If capital were paid to affect the change, the system could adjust the cost basis and holding period for the portion of the newly acquired security attributable to the additional payment that began on the day after the payment. For the portion not attributable to the additional payment, the cost basis and holding period would begin on the day after the trade date on which the original convertible security was purchased.

If the investor is not aware of the cost basis or acquisition date of the convertible security, the system could search the database for the information requested by the user. The system will automatically determine the adjusted cost basis and holding period for that convertible security based on the information provided above. The holding period of that convertible security will also be calculated and displayed in the detail screen for tax purposes.

For example, suppose that in September, an investor bought for $1 a right issued by ABC Corporation entitling the investor, on payment of $99, to subscribe to a bond issued by that corporation.

On October 6, the investor exercised the right and subscribed to the bond, which was issued on October 15. The bond contained a clause stating that the investor would receive one share of ABC Corporation common stock on surrender of one bond and payment of $50.

Later, the investor presented the bond and $50 and received one share of ABC Corporation common stock. The investor did not have a recognized gain or loss. The basis of the investor's share of stock is $150 ($1+$99+$50). The investor's holding period would be split. The investor's holding period for the part based on his ownership of the bond ($100 basis) would begin on October 6. The investor's holding period for the part based on his cash investment ($50 basis) would begin on the day after he acquired the share of stock. Each portion of the basis could be tracked through capital events.

Additionally, table 400 may be used to store a list of mutual fund securities. If an investor is not aware of the cost basis or purchase date, the system may search the database for the information requested by a user. If an investor is not aware of the adjusted cost basis of the mutual fund due to a series of dividend reinvestment events and/or various purchase periods, the system can use an average basis method. The software can first determine, based on the stock symbol, if the mutual fund is equity or fixed income. The system can then ascertain the difference between ordinary income (which is considered ordinary income) and capital gain distributions. The system can identify both undistributed and distributed capital gains for reporting purposes. The system may increase the cost basis of the mutual fund shares when undistributed capital gains are realized. The system further identifies return of capital distributions whereby the cost basis of mutual fund shares is reduced. If the mutual fund shares reached a level of zero, the system may then treat the return of capital distribution as a capital gain. When determining the cost basis of mutual fund shares, the system can use two methods, specific share identification and first in first out (FIFO), provided the investor did not previously use an average basis for the sale of shares of the same mutual fund.

If the investor can definitely identify the shares sold, once the information is entered, the system will use the adjusted basis of those particular shares to determine capital gain or loss. If the shares were acquired at different times or at different prices, and the investor cannot identify which shares were sold, the oldest shares still available are considered sold first.

The system may also use an average basis if the investor acquired the mutual fund shares at various periods and are left on deposit in an account handled by a custodian or agent. The system may further identify between two methods, a single category method and a double category method.

In the Single category method, the system may automatically find the average cost of all shares owned at the time of each disposition, regardless of how long the investor owned them. The system may then determine capital gain or loss based on the holding period. Shares disposed of are considered to be those acquired first. The system could add the cost of all the shares owned (determined by the offer price) and divide by the number of shares owned to determine an average basis per share.

In the Double category method, all shares in an account at the time of each disposition are divided into two categories, short-term and long-term. The system may then identify shares held for one year or less as short-term. Shares held longer than one year may be identified as long-term. The process can determine the basis of each share as an average basis in that category.

For an average basis example, suppose an investor bought 400 shares in the ABC Mutual fund: 200 shares on Jun. 5, 1998, and 200 shares on May 15, 1999. On Nov. 11, 1999, the investor sold 300 shares. The basis of all the shares sold would be the same, but the holding period of 200 shares would be long-term and the holding period for the 100 shares would be short-term.

For a single category example, suppose an investor bought the following shares in the XYZ Mutual fund: 100 shares in 1996 at $10 per share, 100 shares in 1997 at $12 per share, and 100 shares in 1998 at $26 per share. On Apr. 8, 1999, the investor sold 150 shares. The basis of the shares sold would be $2,600 ($16 per share), computed as follows:

$$\text{Total cost} = (\$1,000 + \$1,200 + \$2,600) = \$4,800$$

$$\text{Average basis per share} = (\$4,800/300) = \$16$$

$$\text{Basis of shares sold} = (\$16 \times 150) = \$2,400$$

The screen output screen shown in FIG. 13 displays three alternative cost basis methods: cost basis per share based on closing price, average high and low price, and opening price.

These alternatives are preferably made available to accommodate the user's option of selecting the most favorable tax treatment as permissible by the Internal Revenue Service. It will be understood by those skilled in the art that these alternative cost basis methods are implemented using similar calculation processes (described below); however, each method may use a different set of price information for making calculations.

Figure 14:
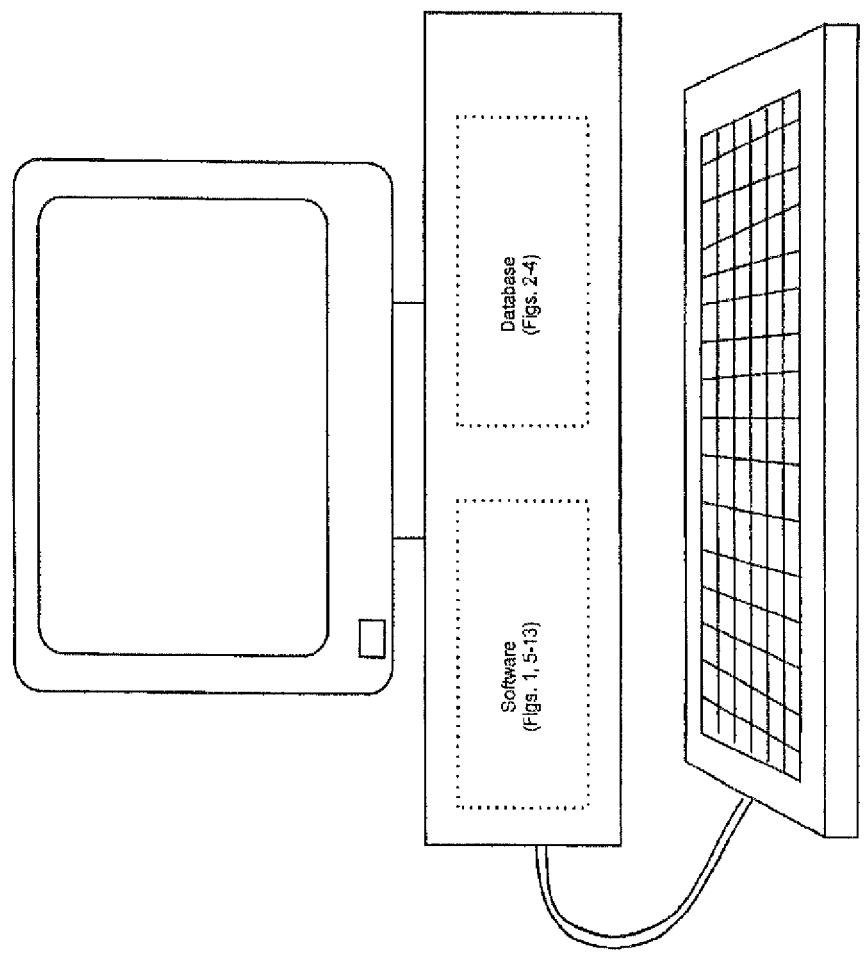
FIG. 14 is a block diagram showing the components of a system for determining a cost basis associated with a security, in accordance with a preferred embodiment of the present invention.

As shown in FIG. 14, the present process is preferably embodied in an automated process, relying on database capabilities to provide the requisite information necessary for the process to be accomplished. The automated process may be hosted on one or more servers. Individual components of the system, such as database, may be provided by different entities, with the individual components communicably connected with the Internet.

The above process is illustrated assuming information regarding an investment is specifically known. If an investor doesn't know a date of purchase, averaged values can be developed for the investor based on a purchased period. Sale dates can also be estimated where investor records do not provide the necessary date.

Although the presently preferred interface between the system and a user is a graphical user interface, the present invention may be implemented in a batch process, such that a list of investments and associated information is presented to the system, allowing present basis determinations to be made on the list. Alternately, the present invention and process may be implemented in spreadsheet fashion, with information provided to the system being provided in the form of a spreadsheet, such that revision of the data provided to the system via the spreadsheet causes the resultant basis determinations to be updated based upon the revision.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A system for determining a cost basis associated with a plurality of shares of a security, comprising:
   a computer having a user interface that receives information identifying an issuer associated with the security, a purchase date of the security, a number of shares of the security purchased on the purchase date, and a sale date of the security; and
   a memory coupled to the computer, wherein the memory stores information retrieved from one or more databases, and instructions, wherein the instructions when executed by the computer cause the computer to perform the following:
   receiving from one or more databases, in response to the information identifying the issuer, the purchase date, and the sale date, a list of capital events that occurred in connection with the security between the purchase date and the sale date, wherein the list of capital events includes at least one event selected from the group consisting of a reinvested dividend event, a stock spin-off event, a stock merger event and a stock split event, and wherein the one or more databases stores past price per share information and capital events for a plurality of different securities associated with different issuers;
   receiving from the one or more databases multiple cost basis adjustment ratios, wherein each of the cost basis adjustment ratios corresponds to one of the capital events that occurred in connection with the security between the purchase date and the sale date; and
   determining a current cost basis associated with the security by applying each of the cost basis adjustment ratios to a purchase price per share of the security on the purchase date, including:
   assigning an intermediate cost basis equal to the current cost basis;
   adjusting the current cost basis by applying a further cost basis adjustment ratio to the intermediate cost basis; and
   repeating the assigning of an intermediate cost basis equal to the current cost basis and adjusting the current cost basis until each further cost basis adjustment ratio associated with the security has been retrieved from the one or more databases and has been used to adjust the current cost basis, wherein each further cost basis adjustment ratio retrieved from the one or more databases has an event date associated therewith and is applied in a chronological order such that a cost basis adjustment ratio associated with a latest event date is applied in a final iteration of adjusting the current cost basis.

2. The system of claim 1, wherein the final adjusted cost basis is at least one of presented on a display, transferred to a tax preparation software program by the computer, wherein the final adjusted cost basis is used by the tax preparation software to prepare a tax return.

3. The system of claim 1, wherein the purchase price per share of the security on the purchase date is provided by a user.

4. The system of claim 1, wherein the purchase price per share of the security on the purchase date is obtained from the one or more databases.

5. The system of claim 1, wherein the plurality of different securities includes common stocks, mutual funds and closed end bond funds.

6. The system of claim 1, wherein the cost basis adjustment ratio associated with each reinvested dividend event received from the one or more databases corresponds to a dividend amount issued per share at the time of each such reinvested dividend event.

7. The system of claim 1, wherein the cost basis adjustment ratio associated with each stock split event received from the one or more databases corresponds to a number of additional shares of a given security issued for each share of the given security held prior to such stock split event.

8. The system of claim 1, wherein the cost basis adjustment ratio associated with each stock merger event received from the one or more databases corresponds to a number of shares of a security associated with a merged entity issued for each share associated with an issuer that merged into the merged entity.

9. The system of claim 1, wherein the cost basis adjustment ratio associated with each stock spin-off event received from the one or more databases corresponds to a number of shares of a security associated with a spun-off entity issued for each share associated with an issuer that divested the spun-off entity.

10. The system of claim 1, wherein the cost basis adjustment ratio associated with a merger event received from the one or more databases corresponds to a number of shares of a security associated with a merger entity issued for each share associated with an issuer that merged with the merger entity.

11. The system of claim 1, wherein the list of capital events further includes worthless security events.

12. The system of claim 11, further comprising notifying a user of the worthless security event, the date of the worthless security event, and the basis of the security at the time of the worthless security event.

13. The system of claim 1, wherein receiving, via a user interface, information identifying an issuer associated with the security, a purchase date of the security, and a number of shares of the security purchased on the purchase date further comprises the computer receiving the information via at least one of a graphical user interface, a spreadsheet interface and a batch list.

14. The system of claim 1, wherein the list of capital events further includes at least one of (a) a security delisting events, and the instructions further cause the computer to notify a user of the delisting event, the date of the delisting event, and the basis of the security of the delisting event, and (b) a security relisting event, and the instructions further cause the computer to determine whether a security has been relisted after a delisting event.

15. The system of claim 1, wherein the system receives the capital events for the plurality of different securities from a first table in the one or more databases, and the system receives price information for each of the plurality of different securities from at least a second table in the one or more databases.

16. The system of claim 15, wherein the system receives security issuer information from a third table in the one or more databases, said security issuer information correlating identification changes in the security.

17. The system of claim 15, wherein for each capital event the information received from the first table in the one or more databases is identified by the one or more databases based on one or more fields corresponding to a name of a company associated with such capital event, a stock symbol associated with such capital event, a CUSIP number associated with such capital event, a date of such capital event, a type of such capital event, and a cost basis adjustment ratio associated with such capital event.

18. The system of claim 17, wherein for each capital event the information received from the first table in the one or more databases is further identified by a field that stores a value correlating the stock symbol and the CUSIP number associated with such capital event.

19. The system of claim 18, wherein the value correlating the stock symbol and the CUSIP number uniquely identifies an issuer associated with a given security in the one or more databases as such issuer undergoes merger events, spin-off events and name change events.

20. The system of claim 15, wherein for each date for which price information is provided from the second table, the system receives from the one or more databases at least one of a high price, a low price, an open price and a close price for at least one of the plurality of different securities.

21. The system of claim 1, further comprising: determining whether a security for which a present basis is to be determined is an option security; and where the security for which a present basis is sought is an option security, determining whether the option security was exercised.

22. The system of claim 21, further comprising: retrieving a cost basis adjustment ratio and an exercise price for an option security from the one or more databases when it is determined that the option security was exercised; and determining from an option security basis and the exercise price a basis in a security obtained by exercise of the option security.

23. The system of claim 21, further comprising: retrieving an expiration date from the one or more databases when it is determined that an option security has not been exercised; and where the expiration date is prior to the present date, informing a user of the expiration of the option security, the date of such expiration, and the basis of the option securities held on the date of expiration.

24. The system of claim 1, wherein the list of capital events further includes at least one of at least one rights issuance and at least one warrants issuance.

25. The system of claim 24, further comprising: when rights issuance is retrieved as a capital event for a security, notifying the user of the rights issuance; when a warrants issuance is retrieved as a capital event, notifying the user of the warrants issuance; determining whether the rights issuance has been exercised and whether the warrants issuance has been exercised; when the rights issuance has been exercised, determining a basis allocation between the original security and a security acquired by exercise of the rights issuance; and when the warrants issuance has been exercised, determining a basis allocation between the original security and the interest acquired by exercise of the warrants issuance.

26. The system of claim 1, wherein the system is a hosted system and the user interface comprises an Internet browser.

27. The system of claim 1, wherein the one or more databases is one or more remote third party hosted databases.

28. The system of claim 1, wherein the system is implemented across a network.

29. The system of claim 1, wherein the computer comprises one or more servers.

30. The system of claim 29, wherein the instructions are hosted on the one or more servers.

* * * * *